United States Patent [19]

Janssen

[11] 4,403,663
[45] Sep. 13, 1983

[54] POWER-OPERATED TORQUE WRENCH

[75] Inventor: Harvey W. Janssen, Lafayette, Calif.

[73] Assignee: Wolff Manufacturing Company, Burlingame, Calif.

[21] Appl. No.: 253,106

[22] Filed: Apr. 13, 1981

[51] Int. Cl.³ ............................................. B25B 21/00
[52] U.S. Cl. ........................................ 173/12; 74/128; 192/150
[58] Field of Search .................... 173/12, 93, 935, 163; 73/862.21, 862.22, 862.23, 862.25; 74/128, 129, 142, 143, 156, 157; 81/469, 473, 474, 475, 476, 479; 192/150

[56] References Cited

U.S. PATENT DOCUMENTS

| | | | |
|---|---|---|---|
| 2,026,400 | 12/1935 | Reid | 74/157 X |
| 3,529,513 | 9/1970 | Amtsberg | 173/12 X |
| 3,586,115 | 6/1971 | Amtsberg | 173/12 X |
| 3,675,514 | 7/1972 | Walker | 173/12 X |
| 3,686,983 | 8/1972 | Flagge | 173/12 X |
| 3,897,834 | 8/1975 | Swopsher et al. | 173/12 |
| 3,930,776 | 1/1976 | Keller | 74/156 X |
| 4,137,758 | 2/1979 | Rodland | 73/862.25 |
| 4,199,032 | 4/1980 | Weiner et al. | 173/12 |
| 4,300,641 | 11/1981 | Kinkel | 173/12 |

Primary Examiner—Harold D. Whitehead
Assistant Examiner—Robert P. Olszewski
Attorney, Agent, or Firm—Flehr, Hohbach, Test, Albritton & Herbert

[57] ABSTRACT

A power operated wrench having a drive shaft, said drive shaft being initially driven by a motor to provide initial torque, overriding clutch means for driving said shaft and drive means for applying a predetermined torque via the clutch and thereafter rotating said shaft an additional predetermined amount.

8 Claims, 10 Drawing Figures

FIG_1

FIG_2

FIG_3

FIG_4

FIG_5

FIG_6

FIG_7

FIG_8

FIG_9

FIG_10

POWER-OPERATED TORQUE WRENCH

This invention relates generally to power operated wrenches and more particularly to a power-operated torque wrench.

In the assembly and disassembly of various articles of manufacture, it is common practice to employ power-operated wrenches such as torque wrenches. One field in which torque wrenches are extensively used is in connection with track-laying tractors for the installation of track threads. For such purposes, wrenches of the type described in U.S. Pat. Nos. 3,108,507 and 3,780,603 have been used.

In U.S. Pat. No. 3,108,507, there is described a power operated wrench which can be easily manipulated. In U.S. Pat. No. 3,780,603, there is described an impact wrench that delivers a predetermined number of impacts after a predetermined torque has been reached to provide suitable tightening of the associated bolts. It is desirable, however, to provide a power-operated torque wrench which applies a predetermined rotation or tightening of the bolt after a given torque is reached. For example, in the installation of shoes of a track-laying vehicle, certain manufacturers recommend that after the bolts have been tightened to a predetermined torque, an additional 120° of rotation is to be applied. The additional tightening stretches the bolt for good retention of the associated nut.

U.S. Pat. Nos. 3,675,514 and 3,897,834 disclose torque wrenches or equivalents which apply a given torque to a member, after which further tightening force is applied. U.S. Pat. No. 3,897,834 discloses applying an additional 120° of rotation after having reached a predetermined torque.

In the installation and removal of bolts such as track bolts, it is desirable to rapidly drive the associated bolt during times of least resistance, that is, during initial tightening and final loosening and, thereafter, to properly tighten the bolt during a tightening operation and to provide suitable power for breaking loose the bolt during a loosening operation. Thus, there are two modes of operation: a first mode which is a rapid rotation of the driving member to provide initial tightening or final loosening of the bolt, and a period during which maximum torque is to be applied during initial loosening and final tightening.

It is a general object of the present invention to provide an improved power operated torque wrench.

It is another object of the present invention to provide a hydraulically powered torque wrench.

It is still another object of the present invention to provide a wrench which is driven by a hydraulic motor during low-torque operation and which is driven by a reciprocating hydraulic cylinder during high-torque operation.

It is a further object of the invention to provide a torque wrench which turns an associated bolt through a predetermined angle of rotation after the bolt reaches a predetermined torque.

The foregoing and other objects of the invention are achieved by a power-operated torque wrench which includes a drive shaft, a motor coupled to said shaft for driving and rotating said shaft during low-torque operation and drive means including an overriding clutch means coupled to said shaft for driving said shaft during high-torque operation.

The foregoing and other objects will be more clearly understood from the following description taken in connection with the accompanying drawings.

Figure 1:
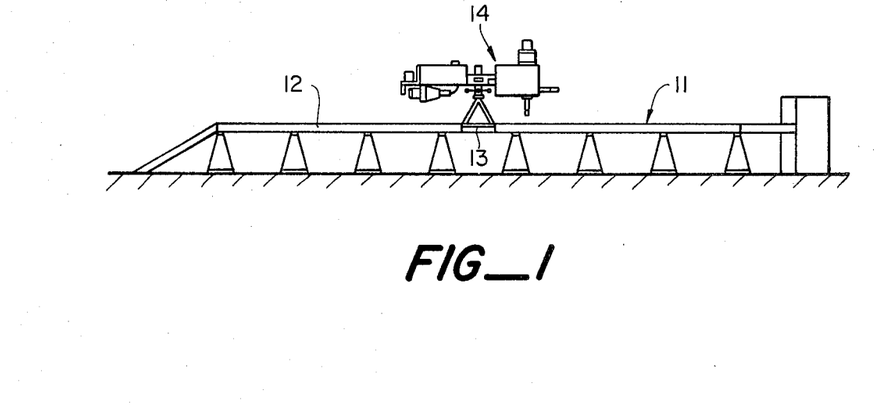
FIG. 1 is a side elevational view showing a conveyor and shoe lifting assembly for tractor tracks which is adapted to mount a power-operated torque wrench for movement along the track for engagement with the track bolts.

FIG. 1 shows a conveyor and shoe lifting assembly 11 which is adapted to receive, hold and provide for movement of tractor tracks. The assembly is schematically shown and a complete description of a conveyor and shoe lifting assembly is more completely described in U.S. Pat. No. 4,167,058.

Not only does the conveyor and shoe-lifting assembly provide for the support and movement of the tractor tracks, but it also includes said rails 12 which mount a carriage 13 for longitudinal movement therealong. The carriage supports torque wrench assembly 14. The support includes means for lifting and lowering the torque wrench assembly including threaded member 16 and hand-driven nut 17 engaging the member and serving to raise and lower the assembly 14. Also, the mounting is such that the wrench assembly can be tilted to bring the socket 18 into engagement with an associated bolt or nut of a track carried by the track support and conveyor assembly.

Figure 2:
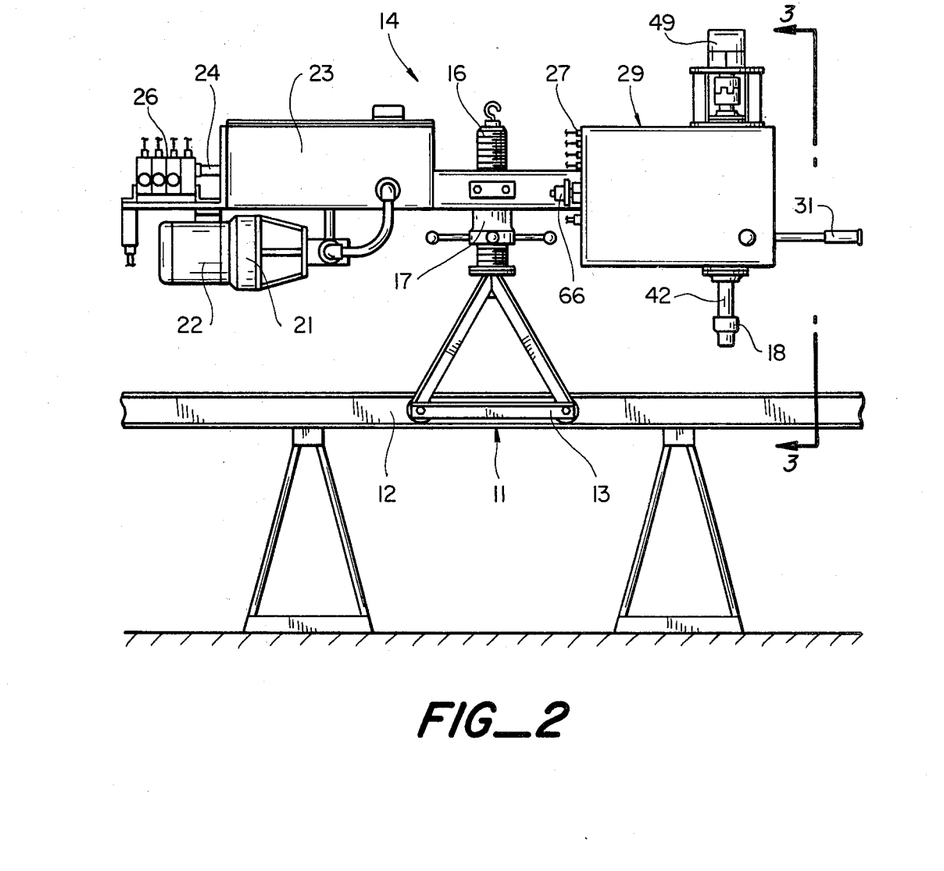
FIG. 2 is an enlarged view of the power-operated wrench in accordance with the present invention.

The torque wrench assembly illustrated includes a hydraulic pump 21 driven by motor 22 and which serves to pump fluid from the reservoir 23 along line 24 to a plurality of solenoid-operated valves 26. The valves 26 are connected by flexible tubing 27 (not shown in detail) to a hydraulic motor 49 and to hydraulic cylinders disposed within the housing 29, to be described in detail. The torque wrench assembly includes a handle 31 for moving the socket 18 into engagement with an associated nut or bolt and which by a turning movement provides switching of control circuits as will be presently described.

Figure 3:
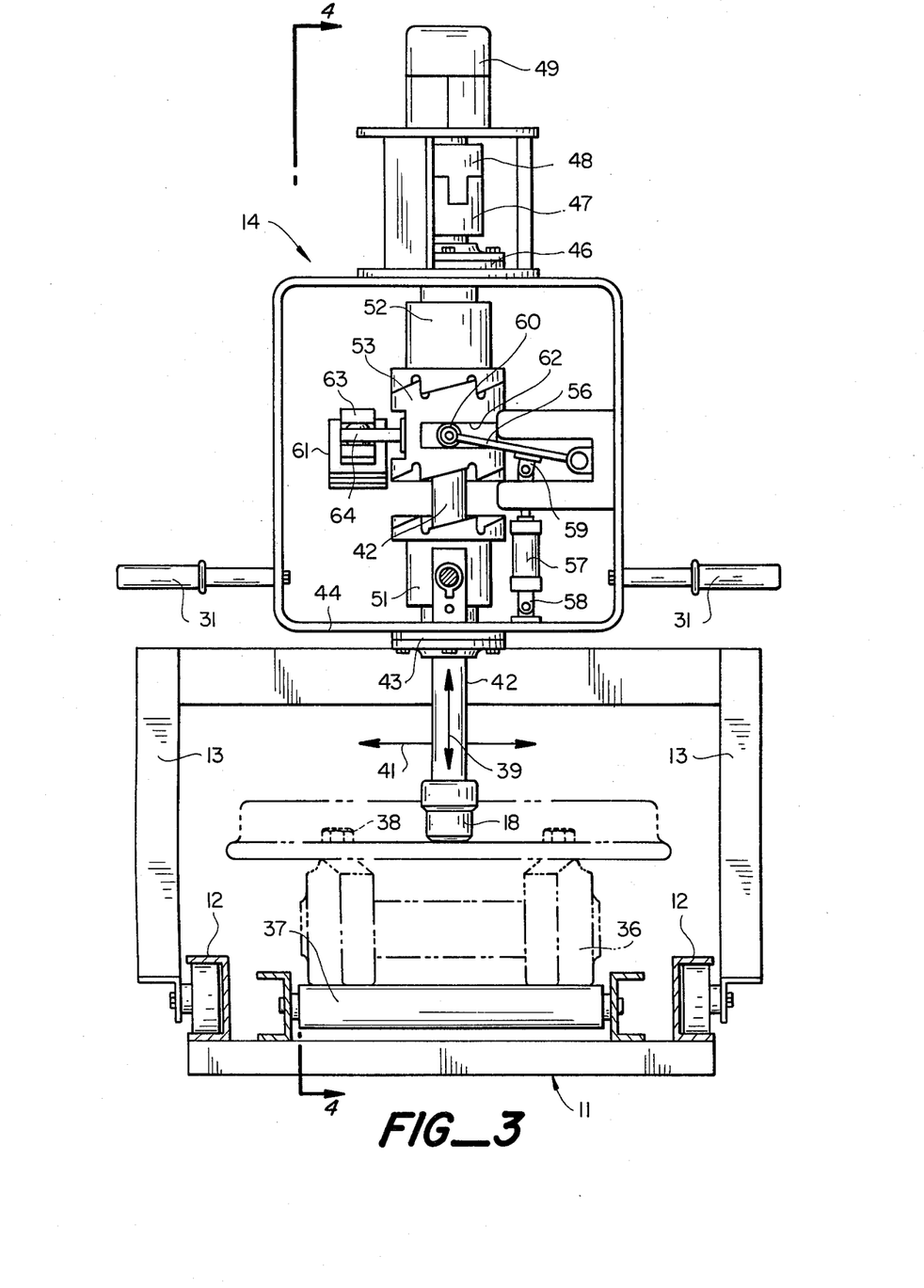
FIG. 3 is a view taken generally along the lines 3—3 of FIG. 2 with the housing broken away to show the working parts of the torque wrench.
Figure 4:
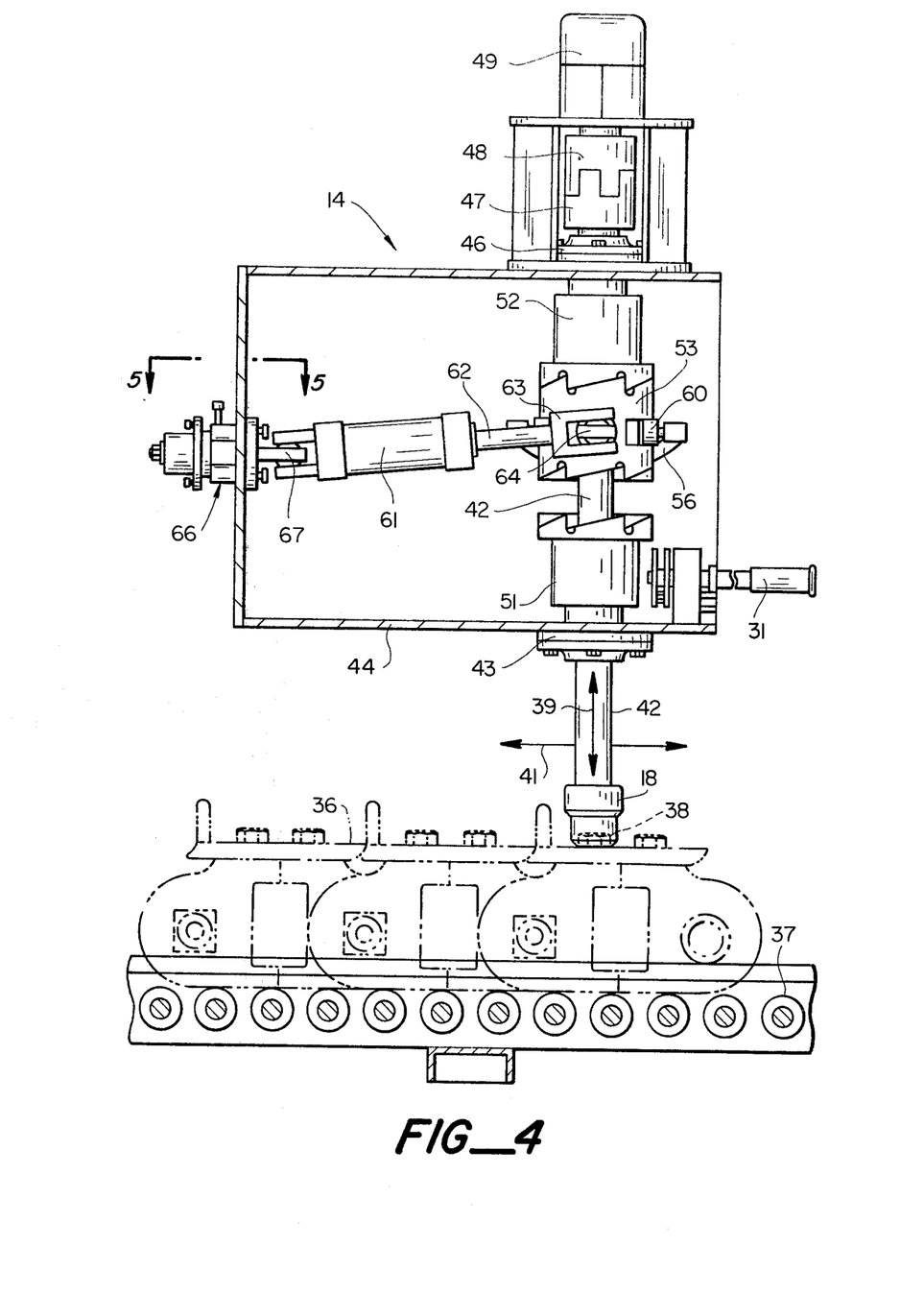
FIG. 4 is a view taken generally along the line 4—4 of FIG. 3 broken away to show the working parts of the torque wrench.

Turning now to FIGS. 3 and 4, a track assembly 36 is shown supported on the roller conveyors 37 in cooperative relationship with the torque wrench assembly 14. More particularly, the torque wrench is shown in its lowered position with the socket 18 in engagement with nut 38 which holds a track shoe to an associated track link. The arrow 39 shows vertical movement of the torque wrench assembly for lifting and engaging an associated nut, while the arrow 41 shows horizontal movement for moving from one nut to the next.

The socket 18 is mounted on a shaft 42 which extends upwardly through a bearing 43, housing 44 and upper bearing 46 to a coupling 47. The coupling 47 is mated with a coupling 48 driven by a hydraulic motor 49 which receives fluid under pressure from the hydraulic pump 21 through suitable solenoid-operated hydraulic valves. The action of the motor 49 is to rapidly rotate the shaft 42 to rotate the associated socket for rapidly tightening and loosening an associated nut 38 during initial tightening and final loosening.

The torque wrench is also provided with means for providing final tightening to predetermined torque and initial loosening of the bolt as well as providing additional turning movement after the predetermined torque has been reached. For this purpose, the shaft has mounted thereon over-running clutches 51 and 52 which are coupled to the associated shaft 42 by means of one-way drive arrangement. The clutch 51 is arranged so that it can drive the shaft in a clockwise direction, while the clutch 52 is coupled to the shaft so that it can drive the shaft in a counter-clockwise direction. The clutches may, for example, be of the type sold by Dana Industrial, Formsprag Model No. 600. The clutches 51 and 52 are driven by a drive sprocket 53 mounted on the shaft for longitudinal movement therealong so that the sprocket can engage either the outer race of the lower clutch or the upper clutch outer race and drive sprockets are provided with mating jaws by which the outer races of clutches 51, when engaged, can be driven in the clockwise direction and when engaged, the outer race of clutch 52 can be driven in the counter-clockwise direction.

The sprocket 53 is moved axially along the shaft by means of a yoke 56 which is driven by hydraulic cylinder 57 which has one end 58 attached to the case 44 and its other end in engagement with the yoke at 59 whereby energization of the cylinder 57 moves the cylinder piston to lift or lower the drive sprocket 53 for engagement with the clutches 52 or 51 depending upon whether the associated nut is to be tightened or loosened. The end of the yoke 56 is provided with rollers 60 which ride within grooves 62 to permit the sprocket to rotate through a predetermined angle in response to turning force provided by the main hydraulic cylinder 61.

Referring particularly to FIG. 4, the main hydraulic cylinder 61 is shown with its drive rod 62 provided with a yoke 63 which engages a lug 64 secured to the drive sprocket. The body of the hydraulic cylinder is secured to a torque determining assembly 66. Thus, by applying hydraulic fluid to the hydraulic cylinder 61, the piston is caused to move outwardly and inwardly responsive to suitable control of the hydraulic fluid, as will be presently described. During forward movement, the drive sprocket 53 rotates freely because the outer race of the clutch is free to rotate, and during retractive movement, the clutch turns the shaft 42 through a predetermined angle depending upon the stroke length and the diametrical position of the lug 64. This then provides tightening rotation to the shaft 42 to tighten an associated nut. If the drive sprocket is in the other position, then when the piston 62 is extended, it loosens the bolt while retraction merely allows for movement of the outer race of the over-riding clutch to rotate. Thus, there has been provided means to apply torque to the shaft 42 responsive to operation of hydraulic cylinder 61.

Figure 5:
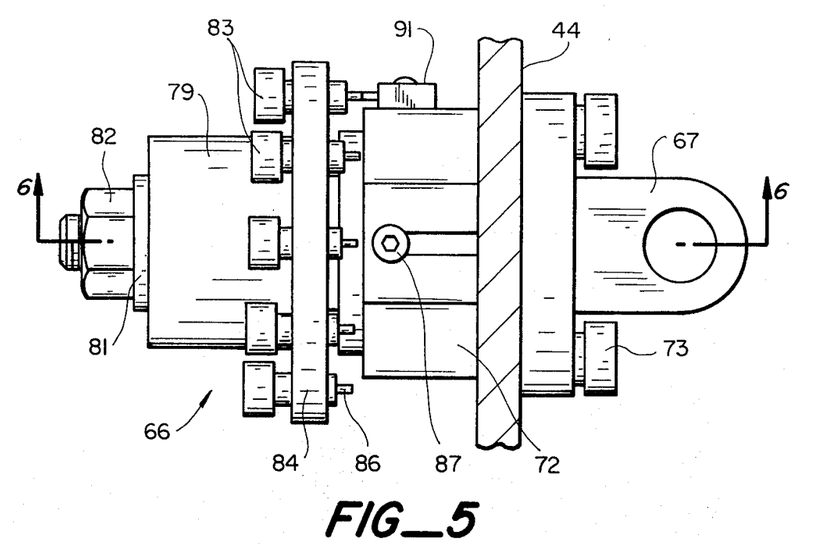
FIG. 5 is an elevational view of a torque sensing assembly in accordance with one feature of the invention.
Figure 6:
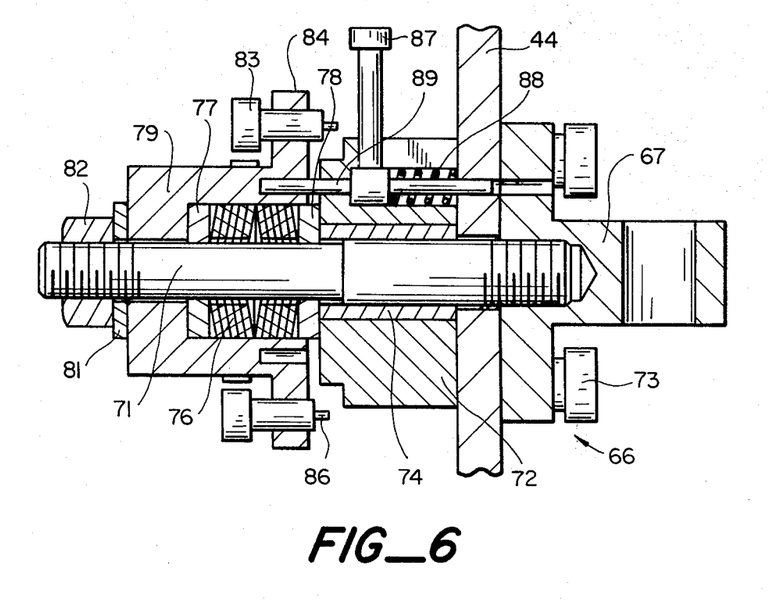
FIG. 6 is a cross-sectional view taken generally along the line 6—6 of FIG. 5 showing the interior of the torque-sensing assembly.

As just described, the body of the cylinder 61 is attached to a torque responsive assembly 66. The assembly is more clearly shown in FIGS. 5 and 6. It comprises the eyelet 67 which is engaged by the body of the hydraulic cylinder; the eyelet is threadably secured to a shaft 71. By moving the eyelet 67, the shaft is moved longitudinally. The assembly 66 includes a body 72, the assembly is secured to the housing 44 by means of studs 73 engaging the eyelet 67. However, the heads of the studs 73 are spaced from the walls of the eyelet 67 to permit longitudinal movement of the eyelet and associated shaft 71 to cause the body 72 to abut the housing 44. A suitable bushing 74 is provided in the housing 72. The end of the shaft carries a plurality of washers 76 beveled in opposite directions as shown and disposed between the spacers 77 and 78. A second housing member 79 is secured between the spacers 77 and the washer 81 by means of a nut 82 threaded to shaft 71. Thus, movement of the eyelet 67 under tension from the hydraulic cylinder will provide longitudinal force to the shaft 71 which then moves to the right to compress the washers and move the member 79.

The member 79 includes a collar 84 having a plurality of adjustable thumb screws 83 which are threadably received by the collar 84. The ends of the thumb screws include abutment member 86. Thus, the longitudinal position of the abutment members 86 may be adjusted by adjusting the thumb screws. The member 79 is mounted for rotation and can be rotated by moving the handle 87 to compress the spring 88 and remove the stop member 89 from the collar whereby it can be rotated to a new position with another abutment 86 adapted to abut a switch 91, FIG. 5. By adjustment of the thumb screws to provide different longitudinal positioning of the member 86, it is possible to provide means whereby the switch 91 will be activated when there is predetermined different tension on the link 67 as determined by different flexure of the washers 76. During a tightening operation, that is, with the sprocket 53 engaging clutch 51, as the hydraulic cylinder is actuated and tends to rotate the shaft clockwise for tightening motion, the tension on the clutch increases until the abutment 86 strikes the switch to control a solenoid-operated valve and stop further movement of the cylinder to thereby provide predetermined adjustable torque to the associated nut.

Figure 9:
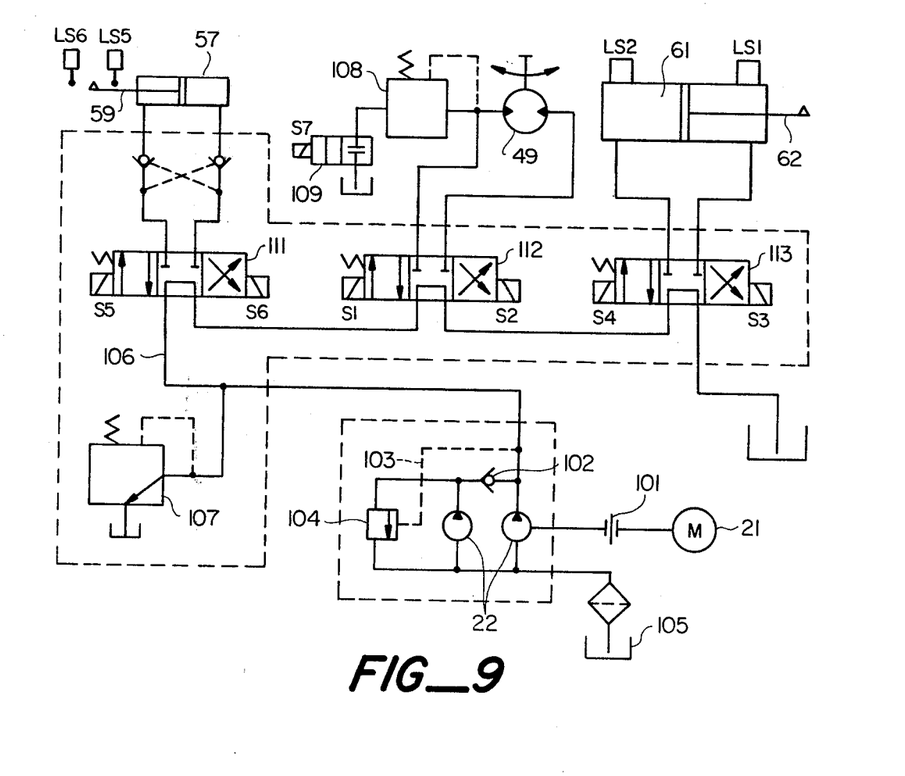
FIG. 9 is a diagram showing the hydraulic flow in the torque wrench.

Turning now to the hydraulic fluid flow diagram of FIG. 9 and making reference to the prior description, operation of the torque wrench is generally described. The motor for the hydraulic pump 21 is shown coupled by a coupling 101 to a two-stage hydraulic pump 22 with the stages interconnected by a pressure relief valve 102. The pump operates at high volume for low pressure and low volume for high pressure. It may, for example, be a Delta Model No. C251L. Excess fluid is returned by the line 103 through the valve 104 to the sump 105 which comprises the fluid tank 23. The pressure in the main line 106 may be maintained by a pressure control 107 which is part of the pump. In certain instances it is desirable to provide multiple pressure controls which can then be set so that the pressure applied to the motor 49 can be at predetermined different levels for handling bolts of different sizes without applying excessive torque which might strip or twist the bolts. For this purpose an additional system relief valve 108 is illustrated connected to the tightening side of the motor 49 to provide relief at a different lower pressure, for example, the valve 107 may be set at about 2500 psi, while the valve 108 is set at about 500 psi. Switching means are associated with the valve and controlled by the electrical circuit whereby the low pressure valve is cut into the circuit by a solenoid operated valve 109 controlled by the circuit to be described in connection with FIG. 10. Except for the foregoing, the description of operation to follow is identical regardless of the pressure in the main line 106.

The main line 106 is shown connected to the yoke cylinder 57 by solenoid operated valve 111 to the pump 49 by solenoid operated valve 112 and to the main cylinder 61 by solenoid operated valve 113. As previously described, the cylinder 57 serves to move the yoke to engage the drive sprocket 53 with one of the clutches 51 or 52. As shown, the yoke is associated with limit switches LS5 and LS6. For the present, it is assumed that the control handle is rotated to activate the solenoid S5 associated with the solenoid operated valve 111 to apply pressure to the cylinder to retract the piston shaft until limit switch LS5 is activated. At this point, the drive sprocket 53 is in engagement with the clutch 51 for a tightening operation. At the same time, the solenoid S1 is operated to cause the solenoid valve 112 to apply hydraulic pressure to the motor 49 to power the motor to thereby rotate the shaft 42 in the clockwise direction until the motor stalls. The operator then moves the control to a second position whereby the solenoid valve 113 is brought into operation by moving from the idle position to retract the piston which is normally in its extended position to tighten the associated nut; the piston is then extended and retracted until a predetermined torque has been applied, at which time the switch 91 is activated to stop movement of the piston. The electrical circuit previously described serves to then control the solenoid valve 113 to extend the drive piston. Thereafter, it provides two tightening strokes which rotates the shaft through 120° of rotation for the final tightening. The piston is then extended and all solenoid valves are in their idle position. The wrench can then be moved to engage and tighten another bolt.

In the loosening operation, the handle is moved whereby the piston 57 moves the yoke upwardly and hydraulic pressure is applied to the cylinder 61 to push and loosen the nut. After several strokes, the operator can switch to operate the solenoid S2 of solenoid valve 112 to attempt to loosen. If the nut is not loose enough, the motor will not overcome the resistive force and the operator switches back to apply additional loosening strokes. Finally, when he switches to the motor, the motor will rapidly unscrew the nut to remove the same.

Figure 10:
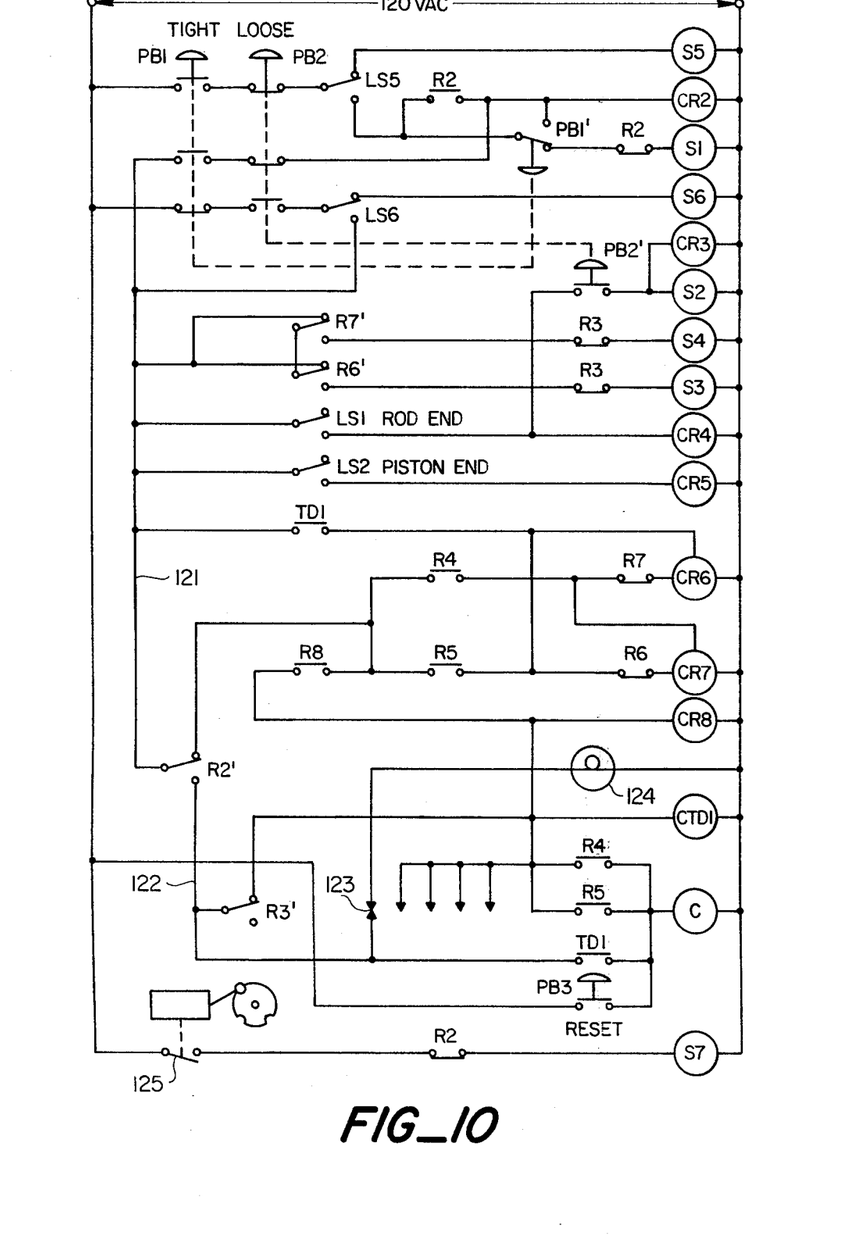
FIG. 10 is a schematic diagram of the control circuits for controlling operation of the torque wrench of the present invention.

A more detailed description of the operation of the electric circuit of the torque wrench is provided in connection with the description of the control circuit shown in FIG. 10. Referring to the Figure, the switch PB1 is the switch activated by the operator to initiate a tightening operation. Closure of the switch energizes the solenoid S5 which then operates the piston 57 to lower the yoke 56 to bring the sprocket 53 into engagement with the clutch 51. When the piston reaches the end of its stroke, it activates the switch LS5. At this point the solenoid S1 is energized to connect the hydraulic motor 49 and drive the nut. As soon as the motor stalls, the operator switches PB1 to its second position activating switch PB1', latching relay R2 to provide power on the line 121. Second relay contact R2' connects line 121 to line 122. Coils CTD1 and CR8 are energized connecting the line 122 to relay coils CR6 and CR7 via contacts R4, R5, R6 and R7 which are interconnected to alternately closed and open switch R7' and R6' to extend and retract the piston 61 alternatively activating switches LS1 and LS2 which energizes relay coils CR4 and CR5 to provide a flip-flop active for latching relay coils CR6 and CR7 to extend and retract the piston 61. When a predetermined torque is reached, the switch R3(19) is opened closing contacts CTD1, energizing counter C and applying power from line 121 to coils CR6 and CR7. Coil CR6 is energized and extends the piston. The piston is then retracted and extended to a count of five, two tightening strokes, at which time contact 123 energizes indicator light 124. All power to relay coils CR6 and CR7 is removed and switches R6 and R7 are open placing the torque wrench in readiness for another tightening operation.

For loosening, the switch PB2 is activated energizing solenoid S6 to bring the yoke 56 upward and engage the sprocket 53 into engagement with the clutch 52. The switch LS6 is then switched to connect power to the line 121. The line 121 is connected to the relay coils CR6 and CR7 via switches R4, R5, R6 and R7 and the latching action is to alternately extend and retract the main piston 61. When the operator is of the opinion the nut is loose enough to be loosened by the hydraulic motor 49 he closes switch PB2' applying power to the motor via solenoid S2. If the motor cannot turn the nut, the operator switches back for a few more strokes of the piston.

When lower hydraulic pressures are desired, the switch 125 is closed activating solenoid valve S7 to bring the pressure regulator 108, FIG. 9, into the hydraulic circuit.

Figure 7:
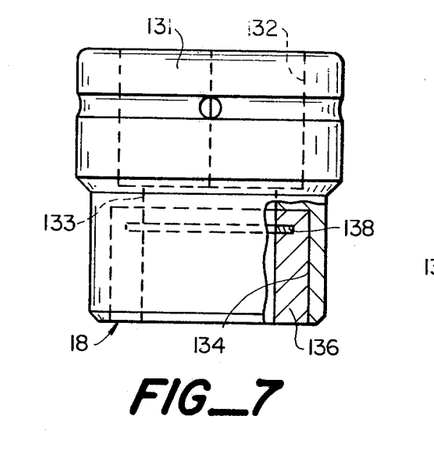
FIG. 7 is a side elevational view, partly in section, of a socket in accordance with another feature of the invention.
Figure 8:
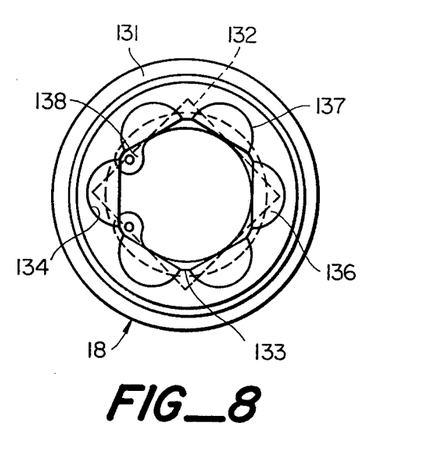
FIG. 8 is a plan view of the socket shown in FIG. 7.

In accordance with another embodiment of the invention, there is provided a self-tightening socket 18. Referring to FIGS. 7 and 8, the socket 18 is seen to include a body 131 which includes a square opening 132 for receiving the squared end of the drive shaft 42. The other end of the socket includes a round opening 133 having a plurality of spaced round cutouts 134 which are adapted to receive keys 136 having a rounded side 137 seated in the cutouts and a flat side adapted to engage the sides of a hexagonal nut. The keys are retained by a retainer spring 138. A torque is applied to the socket, the keys ride upward in the rounded grooves and are cammed against the face of the associated nut to tightly grip the nut during a tightening or loosening operation. This assures a good grasp of the nut and prevents slippage.

It is apparent that the control circuit described can be replaced by an electronic circuit.

Thus, there has been provided an improved torque wrench and socket. The wrench provides for rapid rotation during initial tightening or final loosening and then slow tightening or loosening rotation. A motor drives the wrench during the initial tightening or final loosening while a hydraulic cylinder acts through a over-running clutch to apply high torque. The torque wrench decreases the time that it takes to tighten or loosen bolts.

What is claimed is:

1. A power operated wrench comprising a drive shaft adapted to receive a socket, a motor coupled to said shaft for rotating said shaft, drive means including an overriding clutch means coupled to said shaft to drive and rotate said shaft when the motor is not driving the shaft for applying higher torque to said shaft than the torque capacity of said motor, means for controlling said drive means to apply a predetermined torque to said shaft and then to rotate said shaft through an additional predetermined angle of rotation.

2. A power operated wrench as in claim 1 in which said overriding clutch means comprises first and second clutches coupled to said shaft at spaced locations therealong to drive the same in opposite directions and a drive sprocket adapted to be selectively coupled to said clutches for driving said shaft in a first and second direction.

3. A power operated wrench as in claim 2 in which said drive means includes a drive cylinder for reciprocably rotating said drive sprocket, said drive sprocket and clutches including means for driving the clutches with the sprocket in the drive direction and rotating in the opposite direction.

4. A power operated wrench as in claim 3 in which said sprocket is moved for engagement with one of said first and second clutches by means of a yoke driven by a hydraulic cylinder.

5. A power operated wrench comprising a drive shaft, a hydraulic motor adapted to rotate said drive shaft and apply a predetermined torque thereto, first and second overriding clutch means coupled to said shaft for selectively driving said shaft in opposite directions of rotation, a hydraulic piston, means for coupling said hydraulic piston selectively to said first or second clutch means whereby to rotate said clutch means through a predetermined degree of rotation with each stroke of the cylinder to provide higher torque than the torque of said motor to said shaft for final tightening and initial loosening of an associated member, means for controlling said cylinder whereby after a predetermined tightening torque has been applied the cylinder operates to provide an additional predetermined angle of rotation to said shaft.

6. A power operated torque wrench comprising a housing having upper and lower walls, bearing means mounted on said walls, a shaft extending through said housing and mounted in said bearings for rotation, a hydraulic motor mounted on the upper wall and coupled to said shaft to rotate said shaft and apply a predetermined torque thereto, first and second spaced overriding clutches mounted on said shaft within said housing for selectively driving said shaft in opposite directions, a drive sprocket slidably mounted on said shaft between said spaced clutches, means for bringing said drive sprocket selectively into engagement with one of said said first and second drive clutches, a tension activated switch assembly mounted on a side wall of said housing, a drive cylinder including a body and a piston mounted between said switch and said drive sprocket for applying a higher torque to said shaft than the torque of said hydraulic motor whereby energization of said piston serves to rotate said sprocket through a predetermined amount whereby when resistive torque is encountered by said shaft said piston rotates said shaft and tensions the pressure switch which activates at a predetermined tension to stop said piston and means for causing said piston to thereafter operate and rotate said sprocket a predetermined additional angle of rotation.

7. A power operated wrench as in claim 6 in which said pressure switch includes first and second body portions, a shaft extending through said body portions and secured to one of said body portions and slidably supported in the other of said body portions and spring means adapted to urge said shaft in a predetermined direction, said tension serving to compress said spring means and move said movable body portions towards the other, a switch mounted on one body portion and abutment means mounted on the other body portion whereby the switch is activated after the shaft has moved a predetermined distance.

8. A power operated wrench as in claim 7 wherein said movable switch body portion includes a plurality of adjustable means whereby rotation of said body portion to bring selected abutment means opposite the switch provides for switching at different tensions.

* * * * *